(12) United States Patent (10) Patent No.: US 8,755,589 B2
Sobczak et al. (45) Date of Patent: Jun. 17, 2014

(54) MEASUREMENT OF BELT WEAR THROUGH EDGE DETECTION OF A RASTER IMAGE

(75) Inventors: Flloyd M. Sobczak, Erie, CO (US); James H. Sealey, Golden, CO (US); Douglas R. Sedlacek, Centennial, CO (US); Mark E. Stuemky, Westminster, CO (US); Justin L. Aschenbrenner, Centennial, CO (US)

(73) Assignee: The Gates Corporation, Denver, CO (US)

(*) Notice: Subject to any disclaimer, the term of this patent is extended or adjusted under 35 U.S.C. 154(b) by 261 days.

(21) Appl. No.: 13/226,266

(22) Filed: Sep. 6, 2011

(65) Prior Publication Data

US 2013/0058560 A1 Mar. 7, 2013

(51) Int. Cl.
*G06K 9/00* (2006.01)
*G06K 9/46* (2006.01)
*B65G 47/00* (2006.01)

(52) U.S. Cl.
USPC ................. 382/152; 382/203; 198/502.1

(58) Field of Classification Search
None
See application file for complete search history.

(56) References Cited

U.S. PATENT DOCUMENTS

| | | | |
|---|---|---|---|
| 5,577,774 A * | 11/1996 | Morikawa et al. | 283/93 |
| 5,600,574 A | 2/1997 | Reitan | |
| 5,796,868 A | 8/1998 | Dutta-Choudhury | |
| 6,301,373 B1 | 10/2001 | Bernie et al. | |
| 6,766,208 B2 | 7/2004 | Hsieh | |
| 7,027,082 B2 | 4/2006 | Iida et al. | |
| 7,146,034 B2 | 12/2006 | Reeves et al. | |
| 7,209,832 B2 * | 4/2007 | Yamamoto et al. | 701/301 |
| 7,660,440 B2 | 2/2010 | Bourg, Jr. et al. | |
| 7,796,807 B2 | 9/2010 | Alumot et al. | |
| 7,863,552 B2 | 1/2011 | Cartlidge et al. | |
| 7,946,047 B2 | 5/2011 | Smith et al. | |
| 2002/0055925 A1 | 5/2002 | Kondo et al. | |
| 2003/0168317 A1 * | 9/2003 | Fromme et al. | 198/502.1 |
| 2004/0091135 A1 | 5/2004 | Bourg, Jr. et al. | |
| 2007/0145308 A1 * | 6/2007 | Kemp | 250/559.08 |
| 2007/0260406 A1 * | 11/2007 | Johnson et al. | 702/40 |
| 2009/0103781 A1 * | 4/2009 | Fleury et al. | 382/104 |
| 2010/0060677 A1 | 3/2010 | Jones et al. | |
| 2010/0064495 A1 | 3/2010 | Iizuka et al. | |
| 2010/0198387 A1 | 8/2010 | Satonaga et al. | |
| 2010/0307221 A1 | 12/2010 | Smith et al. | |
| 2012/0084220 A1 * | 4/2012 | Rider et al. | 705/318 |

OTHER PUBLICATIONS

"Belt Drive Preventive Maintenance & Safety Manual" Gates Corporation, Sep. 2008, 67 pages.
International Search Report and Written Opinion for International (PCT) Patent Application No. PCT/US2012/053818, mailed Jan. 25, 2013 14 pages.
U.S. Appl. No. 14/055,156, filed Oct. 16, 2013, Sobczak et al.

* cited by examiner

*Primary Examiner* — Barry Drennan
*Assistant Examiner* — David F Dunphy
(74) *Attorney, Agent, or Firm* — Sheridan Ross P.C.

(57) ABSTRACT

Tools for determining belt wear are provided. Specifically, non-contact based systems and processes are described which enable a quick and accurate measurement of belt wear. Based on the measurements of belt wear, a wear condition for the belt can be determined. Information regarding the wear condition can then be used to determine an appropriate remedial measure for responding to the determined wear condition.

20 Claims, 11 Drawing Sheets

1

MEASUREMENT OF BELT WEAR THROUGH EDGE DETECTION OF A RASTER IMAGE

FIELD OF THE DISCLOSURE

The present disclosure is generally directed toward measuring belt wear, and more specifically using images to identify belt wear characteristics and predict belt life.

BACKGROUND

Serpentine drive belts are becoming increasingly durable due to the use of Ethylene Propylene Diene Monomer (EPDM) materials. As a result, a historically reliable indicator of belt wear, cracking, occurs less frequently although belts continue to wear over time. One problem that exists due to the use of these advanced materials is that pre-failure wear detection is increasingly difficult to quantify. In other words, serpentine drive belts made of EPDM materials are commonly only diagnosed as excessively worn after a complete failure of the belt.

Recent advances to deal with the above-identified problem require a physical tool that is contacted with a belt being measured. Examples of such tools are described in U.S. Pat. No. 7,946,047 and U.S. Patent Publication No. 2010/0307221 both to Smith et al., each of which are hereby incorporated herein by reference in their entirety. These solutions rely on physical contact between the measurement tool and the belt being measured.

It would be useful to develop a belt measurement solution that does not rely on physical contact between a tool and the belt being measured, and which can quickly and effectively identify belt wear.

SUMMARY

It is with respect to the above issues and other problems that the embodiments presented herein were contemplated. In particular, at least some of the embodiments presented herein provide a belt measurement solution that does not require physical contact between a measurement tool and the belt being measured. More specifically, embodiments of the present disclosure contemplate an image-based measurement solution in which one or more images of a belt can be captured. The captured images of the belt may then be analyzed and compared to a database of belt image data. This analysis and comparison, in some embodiments, results in a wear measurement calculation that can subsequently be used to quantify an amount of wear the belt has experienced. Additionally, belt image data can be used to fine tune and optimized equipment running the belt to improve equipment performance.

In some embodiments, measurement of belt wear is achieved through edge detection of rib width of a raster image.

In some embodiments, the edge detection and/or rib width detection includes a process of capturing one or more images of the belt being measured, performing a Gaussian-blur operation on the one or more images, then performing a greyscale conversion of the one or more images, then performing a binary conversion of the one or more images, and then performing a Canny Edge detection operation of the one or more images.

In some embodiments, for single strand V belts, automatic threshold settings can be determined for binary conversion that yields one region by sampling at discrete levels of gray threshold or alternatively Red/Green/Blue (RGB) values and median value of all thresholds detecting one edge region. In other embodiments, for multi-rib belts (where the ribs run either parallel to or perpendicular to the motion of the belt) sampled at discrete levels of gray intensity or alternatively RGB values, the numbers of ribs in the image(s) are determined by the median value of the ordered sequence of the mode of the detected edge regions. In other embodiments, belt width and a pixel-to-physical ration (e.g., pixel/mm or pixel/in ratio) can be determined by multiplying the known rib spacing of a particular belt by the detected rib region count and the outer detected edges of the belt. In further embodiments, the rib region may comprise a four edge outer envelope of the detected rib area as determined by the Canny edge detection algorithm or other edge detection algorithm.

In some embodiments, a method is provided to identify a belt as overly-worn or failed by determining that (i) the detected number of ribs, (ii) belt width, and/or (iii) pixel/mm or pixel/in ratio in an image are inconsistent with the ideal thresholds of such metrics. In particular, these metrics for a belt may be processed by a rejection/validation algorithm which comprise these metrics with known or preferred metrics for the same type of belt and if the comparison reveals that the belt being measured is not within a predetermined range of the ideal thresholds, then the belt being measured may be rejected.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

Embodiments are described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Although aspects of the present disclosure are discussed in connection with the measurement of belt wear and specifically for serpentine belts having one or more ribs, those of ordinary skill in the art will appreciate that embodiments of the present disclosure are not so limited. In particular, some or all of the algorithms, steps, procedures, or system components described herein may be employed in measuring friction-induced wear and non-friction-induced wear of any device or collection of devices. For instance, it is contemplated that the technology described herein could be used effectively to measure wear in any moving part including gears, wheels, bearings, etc.

For example, embodiments of the present disclosure may be utilized to capture one or more images of an object that undergoes expansion and/or contraction due to thermal fluctuations. These expansions and/or contractions may result in the object becoming fatigued and, eventually, failing. The image-based measurement processes disclosed herein may be used to analyze objects undergoing such thermal expansion and/or contraction and, if necessary, identify the objects as being good (e.g., not requiring a replacement) or bad (e.g., requiring a replacement).

Additionally, the embodiments described herein can be used to determined frictional-induced wear conditions for any type of belt. As an example, the belt that is analyzed may be constructed of any material or combination of materials including, without limitation, rubber, polymer, polyethylene, carbon fiber, Kevlar, metal, polyvinyl chloride, and/or foam.

Figure 1:
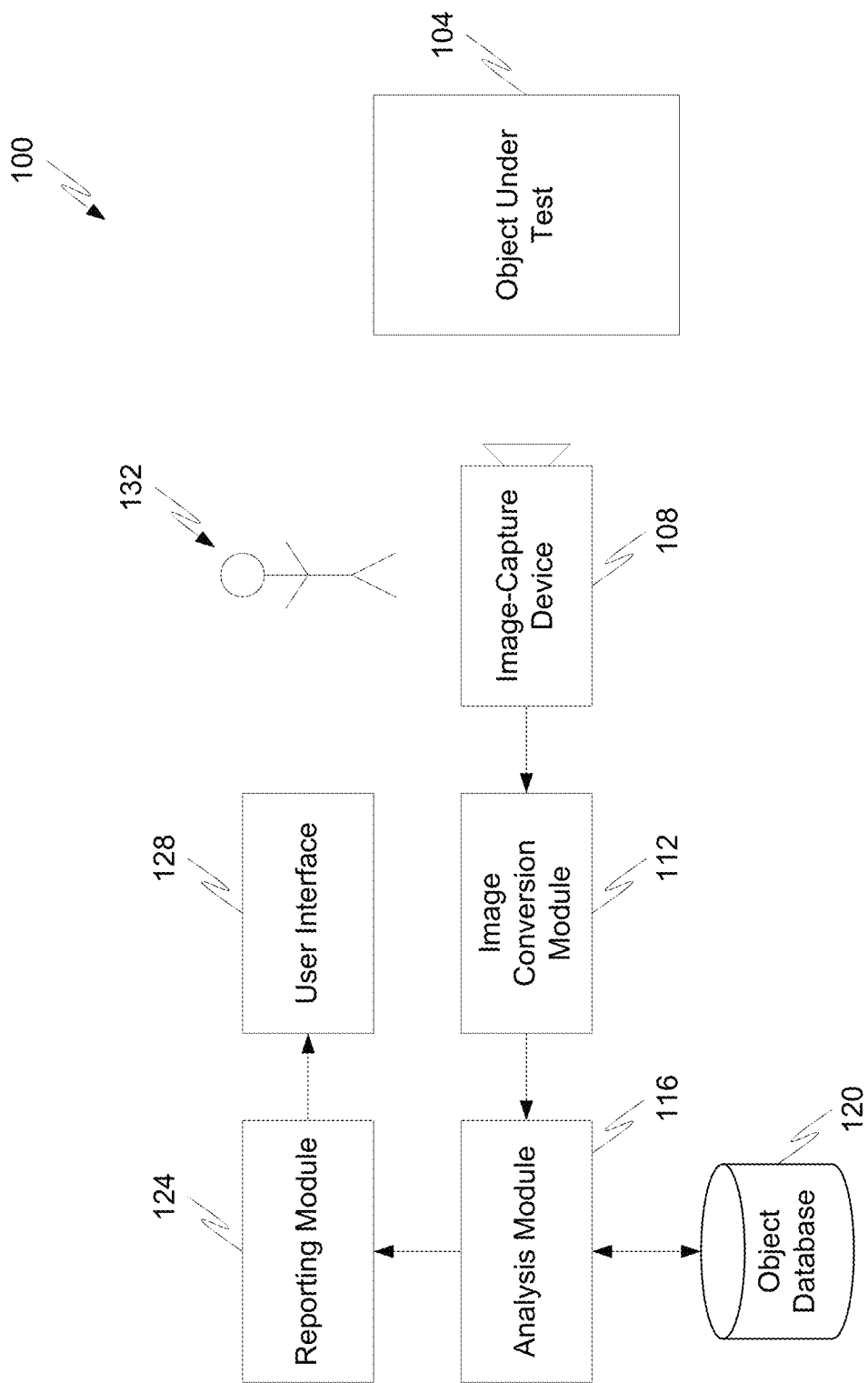
FIG. 1 is a block diagram depicting a measurement system in accordance with embodiments of the present disclosure.

Referring now to FIG. 1, a measurement system 100 will be described in accordance with embodiments of the present disclosure. The measurement system 100 may comprise one or more components for analyzing an object under test 104 and classifying the object under test 104 as either good (e.g., not requiring a replacement) or bad (e.g., requiring a replacement). Other determinations may be made for the object under test 104 without departing from the scope of the present disclosure; for instance, the object under test 104 may be identified as failing (e.g., soon requiring a replacement) or abnormal (e.g., not following an expected wear pattern and, therefore, requiring further investigation and/or replacement).

In some embodiments, the measurement system 100 comprises an image-capture device 108, an image conversion module 112, an analysis module 116, an object database 120, a reporting module 124, and a user interface 128. In some embodiments, each component of the system 100 may be included in a single computing device that is owned and operated by a user 132. As one example, every component of the measurement system 100 may be included in a user device such as a cellular phone, smart phone, Personal Computer (PC), laptop, netbook, tablet, or the like. In other embodiments, the components of the measurement system 100 may be distributed among two or more different computing devices.

In some embodiments, the image-capture device 108 is configured to capture one or more images of the object under test 104. As a non-limiting example, the object under test 104 may comprise a belt, specifically a serpentine belt made of EPDM materials. The belt may either be located in an operational position (e.g., mounted on a vehicle or other device which employs the belt) or it may be in a non-operational position (e.g., removed from a vehicle or other device which employs the belt). The image-capture device 108 may be capable of capturing one or more still images. Alternatively, or in addition, the image-capture device 108 may be capable of capturing video images (e.g., a sequenced number of image frames which may or may not be synchronized with an audio input). The image(s) captured by the image-capture device 108 may comprise color (e.g., a pixel image where each pixel comprises a Red, Green, and Blue (RGB) pixel value), greyscale (e.g., a pixel image where each pixel comprises a greyscale pixel value between 0 and a predetermined number such as 255), black-and-white (e.g., a pixel image where each pixel comprises a binary value corresponding to either a black or white), infrared (e.g., a pixel image where each pixel comprises an infrared pixel value), ultraviolet (e.g., a pixel image where each pixel comprises an ultraviolet value), or any other known type of image. A non-limiting example of the image-capture device 108 is a camera (still or video) that is either a stand-alone device or is incorporated into a user device such as a smart phone.

Depending upon the nature of the image, it may be necessary to reformat the image (e.g., convert it from one image type to another image type) before processing the image and analyzing characteristics of the object under test 104. In some embodiments, the image conversion module 112 is provided to perform image conversions of the image(s) captured by the image-capture device 108 before the image(s) are analyzed by the analysis module 116. In some embodiments, the image conversion module 112 may comprise one or more image filters and/or processing algorithms for detecting contour edges of the object under test 104 in the image(s). As a non-limiting example, the image conversion module 112 is configured to convert greyscale and/or RGB images into black-and-white images by performing one or more edge-detection processes.

The analysis module 116, in some embodiments, is configured to analyze the image(s) of the object under test 104 to determine one or more physical characteristics of the object under test 104. In some embodiments, the analysis module 116 may reference an object database 120 to determine the physical characteristics of the object under test 104. Specifically, the object database 120 may comprise data for a number of different types of objects (e.g., serpentine belts), and each of the different types of objects may have example images for a good object of that type and a bad object of that type. The analysis module 116, in some embodiments, may compare the image(s) captured by the image-capture device 108 with the images in the object database 120 to determine whether the object under test 104 is more similar to a good object or a bad object. Alternatively, or in addition, the object database 120 may comprise one or more metrics and thresholds that define acceptable (or unacceptable) measurements for each of the different types of objects. In such an embodiment, rather than comparing actual images, the analysis module 116 may extract physical dimension data and other physical metrics from the image(s) and compare the physical dimension data of the object under test 104 with the metrics and thresholds in the object database 120. This comparison can be used to determine whether the object under test 104 is a good object or a bad object.

Results obtained by the analysis module 116 may be provided to a reporting module 124, which is configured to prepare a report of the analysis results to the user 132. In some embodiments, the reporting module 124 may comprise functionality to format a report that identifies whether the object under test 104 has been identified as good or bad and whether any further steps should be taken in connection with such a determination. The reporting module 124 may also comprise functionality to transmit the report to the user interface 128. As a non-limiting example, the reporting module 124 may comprise functionality to prepare a report (or reporting statistics) and transmit the report to the user interface 128 via any type of communication protocol.

The user interface 128 may comprise a user input and/or user output device. In some embodiments, the user interface 128 comprises a user output that enables the user 132 to see the results of the report generated by the reporting module 124.

Figure 2:
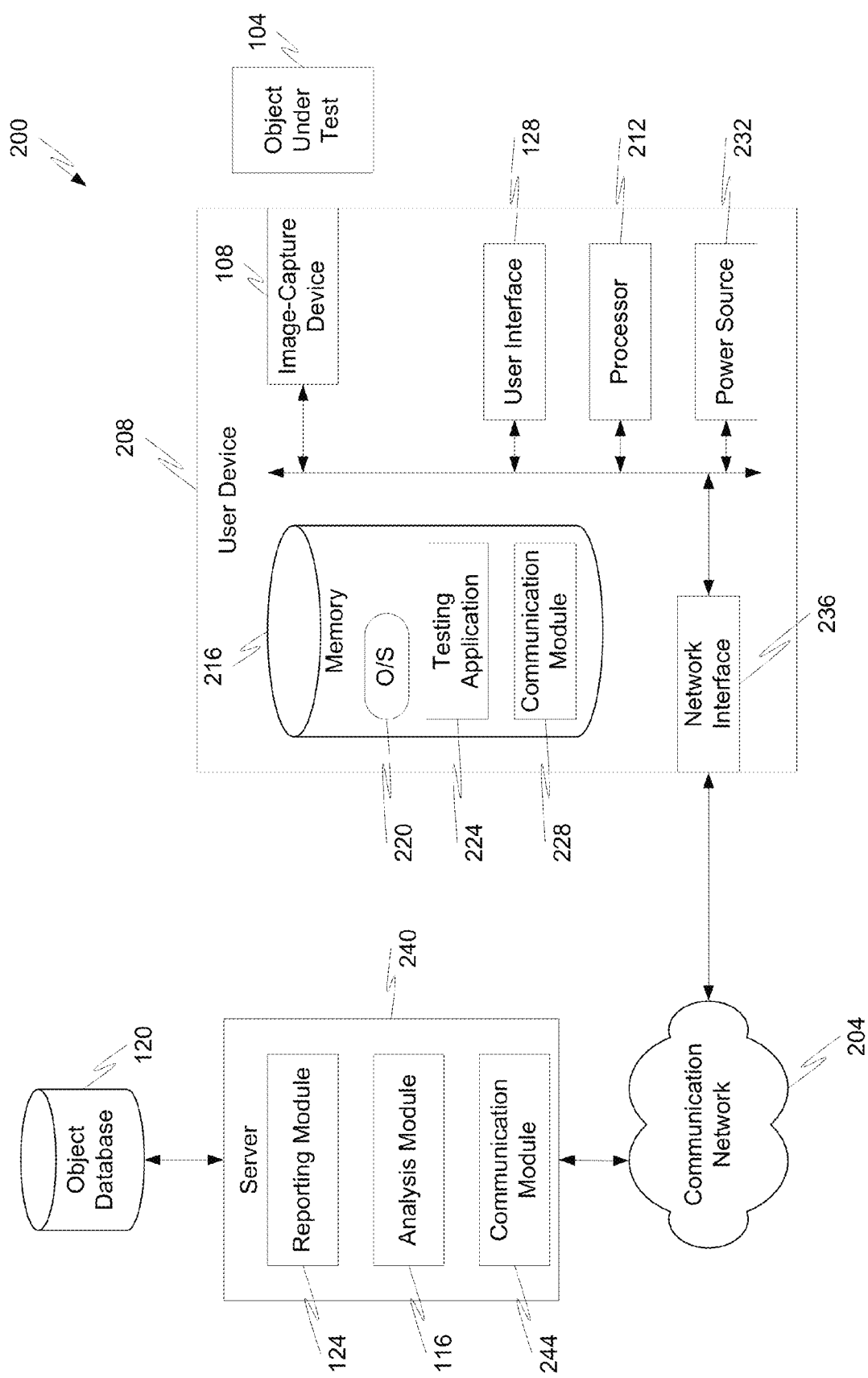
FIG. 2 is a block diagram depicting a communication system in accordance with embodiments of the present disclosure.

Referring now to FIG. 2, a communication system 200 in which the measurement system 100 may be incorporated will be described in accordance with embodiments of the present disclosure. The communication system 200 may comprise one or more devices that incorporate the components of the measurement system 100. Although certain components of the measurement system 100 are depicted as being included in certain components of the communication system 200, those skilled in the communication arts will appreciate that the various components of the measurement system 100 may be distributed among one or more devices of the communication system 200 in any number of ways. For instance, all of the components of the measurement system 100 may be included in a single user device 208. Alternatively, one or more components of the measurement system 100 may be provided on one or more other user devices, on one or more servers 240, a collection of servers, or any other similar device.

In some embodiments, the communication system 200 comprises a user device 208 in communication with one or more servers 240 via a communication network 204. The user device 208, in some embodiments, comprises any type of known communication device or collection of communication devices. Examples of a suitable user device 208 include, but are not limited to, a personal computer (PC), laptop, netbook, Personal Digital Assistant (PDA), cellular phone, smart phone, telephone, or combinations thereof. In general, the user device 208 may be adapted to support video, image, audio, text, and/or data communications with other user devices as well as the server 240. The type of medium used by the user device 208 to communicate with other user devices or server 240 may depend upon the nature of the communication module 228 available on the user device 208.

The server 240 may comprise any type of processing resources dedicated to performing certain functions discussed herein. As a non-limiting example, the server 240 may comprise a web server having hardware and software that helps to deliver content that can be accessed through the communication network 204. One function of a web server is to deliver web pages on the request to clients (e.g., the user device 208). This means delivery of one or more documents to the user device 208 via any type of markup language (e.g., HyperText Markup Language (HTML), eXtensible Markup Language (XML), and the like) and any additional content that may be included by a document, such as images, style sheets and scripts. In some embodiments, the server 240 may comprise the ability to receive requests or other data from the user device 208, where the requests are formatted according to a mutually-agreed upon protocol (e.g., HyperText Transport Protocol (HTTP), Realtime Transport Protocol (RTP), secure variants thereof, or the like). The request may comprise a request for a specific resource using HTTP and it may further comprise a request to perform one or more operations prior to providing a response thereto. Upon receiving a request, the server 240 may locate the requested resource and/or perform one or more operations prior to returning a response to the requesting user device 208 by using the same or a different type of protocol. The communications between the server 240 and user device 208 may be facilitated by the communication modules 228, 244.

The communication module 228 of the user device 208 may comprise a web browsing application (e.g., Internet Explorer®, Mozilla Firefox, Safari®, Google Chrome®, or the like) that enables the user device 208 to format one or more requests and send the requests to the server 240. The communication module 244 of the server 240 may comprise the functionality required to execute one or more scripts and respond to requests from the user device 208. In some embodiments, the communication module 244 may be provided on a dedicated web server while the other components of server 240 (e.g., analysis module 116 and reporting module 124) are provided on a different server that is connected to the web server. In either configuration, the analysis module 116 and reporting module 124 may be made available to the user device 208 via the communication module 244 and the reporting module 124 may be configured to send reports or report results back to the user device 208 via the communication module 244.

The communication network 204 may include wired and/or wireless communication technologies. The Internet is an example of the communication network 204 that constitutes and Internet Protocol (IP) network consisting of many computers, computing networks, and other communication devices located all over the world, which are connected through many telephone systems and other means. Other examples of the communication network 204 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a cellular network, and any other type of packet-switched or circuit-switched network known in the art. In addition, it can be appreciated that the communication network 204 need not be limited to any one network type, and instead may be comprised of a number of different networks and/or network types.

The communication module 228 of the user device 208 may be stored in memory 216 along with other instructions, scripts, etc., which may be referred to generally as applications. In some embodiments, an Operating System (O/S) 220 and testing application 224 may be provided as instructions in memory 216 and these instructions may be executed by the processor 212 of the user device 208. In some embodiments, the processor 212 may comprise one or more Integrated Circuits (ICs), a Digital Signal Processor (DSP), an Application Specific IC (ASIC), a controller, a Programmable Logic Device (PLD), a logic circuit, or the like. In particular, the processor 212 may comprise a general-purpose programmable processor controller for executing application programming or instructions stored in memory 216. In accordance with at least some embodiments, the processor 212 may comprise multiple processor cores and/or implement multiple virtual processors. In some embodiments, the processor 212 may comprise a plurality of physically different processors.

The memory 216 may comprise any device or collection of devices configured for the short-term or long-term storage of information (e.g., instructions, data, etc.). As some non-limiting examples, the memory 216 may comprise Random Access Memory (RAM), any known variant of RAM, solid-state memory, any known variant of solid-state memory, Read Only Memory (ROM), any known variant of ROM, or combinations thereof. As can be appreciated, the memory 216 may not only be used to store the applications for execution by the processor 212, but it may also be used as processing memory (e.g., cache, RAM, etc.) by the processor 212. Alternatively, or in addition, the memory 216 may comprise a hard-disk drive or the like.

The O/S 220 may correspond to any type of known operating system or system platform. In some embodiments, the type of O/S 220 used may depend upon the nature of the user device 208. The O/S 220 represents a high-level application that allows a user to navigate and access the various other applications stored in memory 216. The O/S 220 may also comprise one or more Application Programming Interfaces (APIs) or API-like rules that allow the applications to access and/or control the various other software and/or hardware components of the user device 208.

The testing application 224 may enable the user device 208 to perform one or more functions in connection with testing the object under test 104. As a non-limiting example, the testing application 224 may comprise functionality similar to the image conversion module 112, analysis module, and/or reporting module 124. More specifically, the testing application 224 may comprise an application on the user device 208 that allows a user 132 to operate the image-capture device 108 and capture one or more images of the object under test 104. The testing application 224 may also be configured to format the images captured by the image-capture device 108 for transmission to the server 240 and/or analysis by the analysis module 116. In some embodiments of the analysis module 116 may also be included in the testing application 224. Thus, the testing application 224 can also be configured to determine physical metrics about the object under test 104 based on the images obtained thereof.

In addition to the above-described components, the user device 208 may further comprise the user interface 128, a power source 232, and a network interface 236. In some embodiments, the user interface 128 may comprise one or more user inputs (e.g., microphone, camera, buttons, keys, scanners, etc.), one or more user outputs (e.g., speaker, lights, display screens, etc.), and/or one or more combined user input/output devices (e.g., touch-sensitive display screen, illuminated button, etc.).

The power source 232 may comprise a dedicate power source for the user device 208 such as a battery, one or more capacitors, and the like. The power source 232 may additionally, or alternatively, comprise power adaptors for converting A/C power from an external power source into DC power that is usable by the various components of the user device 208.

The network interface 236 may comprise one or more devices, ports, controllers, drivers, etc. that enable the user device 208 to connect with and communicate via the communication network 204. In some embodiments, the network interface 236 may comprise components that facilitate wired and/or wireless connections with the communication network 204. As some non-limiting examples, the network interface 236 may comprise one or more wireless interfaces that facilitate cellular communications with a cellular communication network, an 802.11X compliant interface, an Ethernet port, or the like.

In addition to facilitating communications with the communication module 244, the communication module 228 of the user device 208 may facilitate other types of communications such as voice, video, text, email, multi-media, etc. with other user devices. As an example, the communication module 228 may comprise functionality that enables the user device 208 to perform voice calls, video calls, send/receive Short Message Service (SMS) messages, send/receive Multi-Media Service (MMS) messages, and the like.

Figure 3:
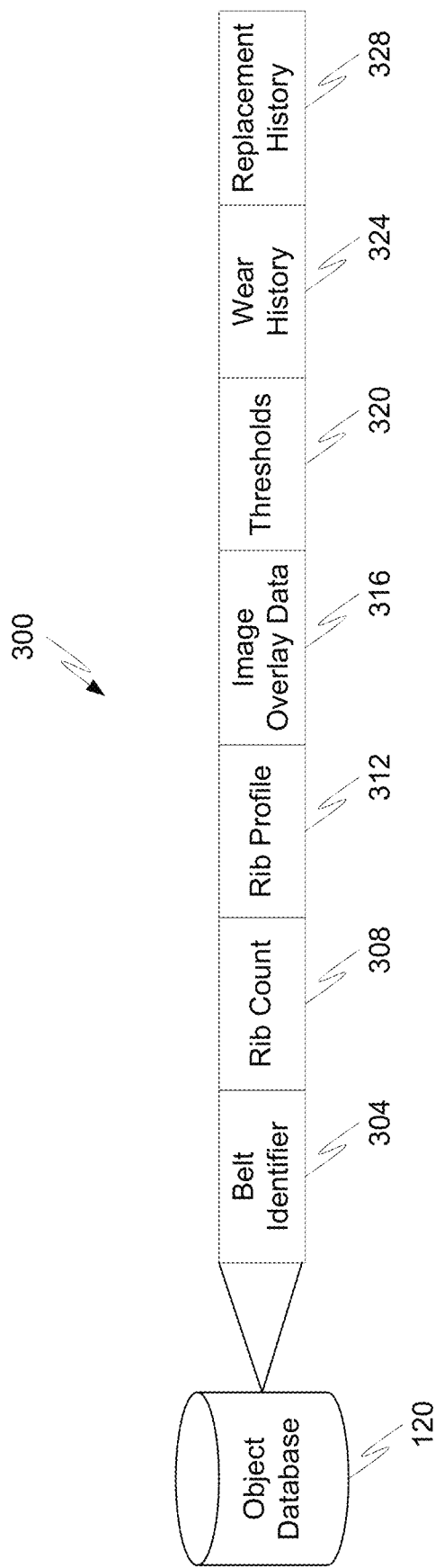
FIG. 3 is a block diagram depicting an example of a data structure used in accordance with embodiments of the present disclosure.

With reference now to FIG. 3, details of a data structure 300 that may be maintained in the object database 120 will be described in accordance with embodiments of the present disclosure. It should be appreciated that the data structure 300 may be maintained completely in the object database 120 and may be retrieved therefrom. In some embodiments, a structured language such as Structured Query Language (SQL) may be followed by the analysis module 116 to perform database lookups and retrieve information from the data structure 300. Alternatively, or in addition, the data structure 300 may be maintained in memory of the server 240 and/or in memory 216 of the user device 208.

In some embodiments, the data structure 300 may comprise a plurality of data fields that can be used by the analysis module 116 to analyze the object under test 104 (or an image thereof) and determine if the object under test 104 is good, bad, or has some other characteristics that may effect its operation. The fields that may be included in the data structure 300 may comprise, without limitation, a belt identifier field 304, a rib count field 308, a rib profile field 312, an image overlay data field 316, a thresholds field 320, a wear history field 324, and a replacement history field 328.

The belt identifier field 304 may be used to store information for identifying any type of object under test 104. If the object under test 104 is a belt, such as a serpentine belt, then the belt identifier field 304 may comprise one or more of a part number, a model number, a Universal Purchase Code (UPC), a part name, a model name, and any other information that can be used to identify the belt. As can be appreciated, if the object under test 104 is not a belt, then any other information specific to that object may be stored in the belt identifier field 304.

Continuing the example of a belt being the object under test 104, the rib count field 308 may be used to store information that identifies the number of ribs on a particular belt type. Alternatively, or in addition, the rib count field 308 can store information that identifies the number of grooves on the belt or any other feature that maintains the belt in a normal operational position.

The rib profile field 312 may be used to store information that identifies physical characteristics of the rib(s) or spaces between the ribs on the belt. For example, the rib profile field 312 may store information that identifies whether the ribs are v-shaped, square-shaped, rounded, etc. The rib profile field 312 may also store information related to manufactured distances between ribs and the like. Any information that identifies a good (expected) profile or a bad (unexpected) profile for the belt may be maintained in the rib profile field 312.

The image overlay data field 316 may be used to store any image data that is used for overlay purposes. For example, the image overlay data field 316 may comprise a number of images of a belt of a particular type. The images may vary from images of good belts to images of bad belts. The image overlay data field 316 may also comprise one or more images of an object under test 104. The image overlay data field 316 may also comprise results of an image overlay process after an image of the object under test 104 is compared to one or more stored images of example belts with known physical properties. More specifically, the image overlay data field 316 may be used to store data that identifies the results of an image overlay process (e.g., which among a plurality of stored example images the image of the object under test 104 is most similar to and physical properties of the stored example image that is most similar to the image of the object under test 104).

The thresholds data field 320 may comprise one or more thresholds for determining whether an object under test 104 is good, bad, or some other state. In particular, the thresholds field 320 may comprise information about one or more belt physical properties that if met, exceeded, etc. by the object under test 104, result in a determination that the object under test 104 is bad, good, etc.

The wear history data field 324 may be used to store information related to historical wear observations for the specific object under test 104 or other objects of similar types. For example, if a belt of a particular type is observed to have an excessive amount of wear on one or more specific ribs (e.g., internal ribs, external ribs, one rib in particular, outer edges, etc.), then such information can be maintained in the wear history filed 324. The wear history field 324 is useful to manufacturers of objects similar to the object under test 104 so that field wear history can be maintained, analyzed, and hopefully used to produce better objects in the future. Alternatively, or in addition, data in the wear history field can be used to fine tune equipment that is using the belt in operation, thereby allowing the equipment (e.g., vehicle, motor, machine, etc.) to continue running optimally as the belt wears.

The replacement history field 328 can be used to store information about the replacement history of a particular object under test 104 or similar types of objects to the object under test. In some embodiments, the replacement history field 328 can identify the amount of use a particular object under test 104 has experienced before it received a grade of bad and had to be replaced. This information can be shared between the manufacturer of the object under test 104 and the consumer of the object under test 104. Additionally, this information can be used to inform maintenance personnel that if an object of a particular type has experienced a certain amount of use, then it may at least be time to subject that object to one or more of the testing procedures described herein.

Figure 4:
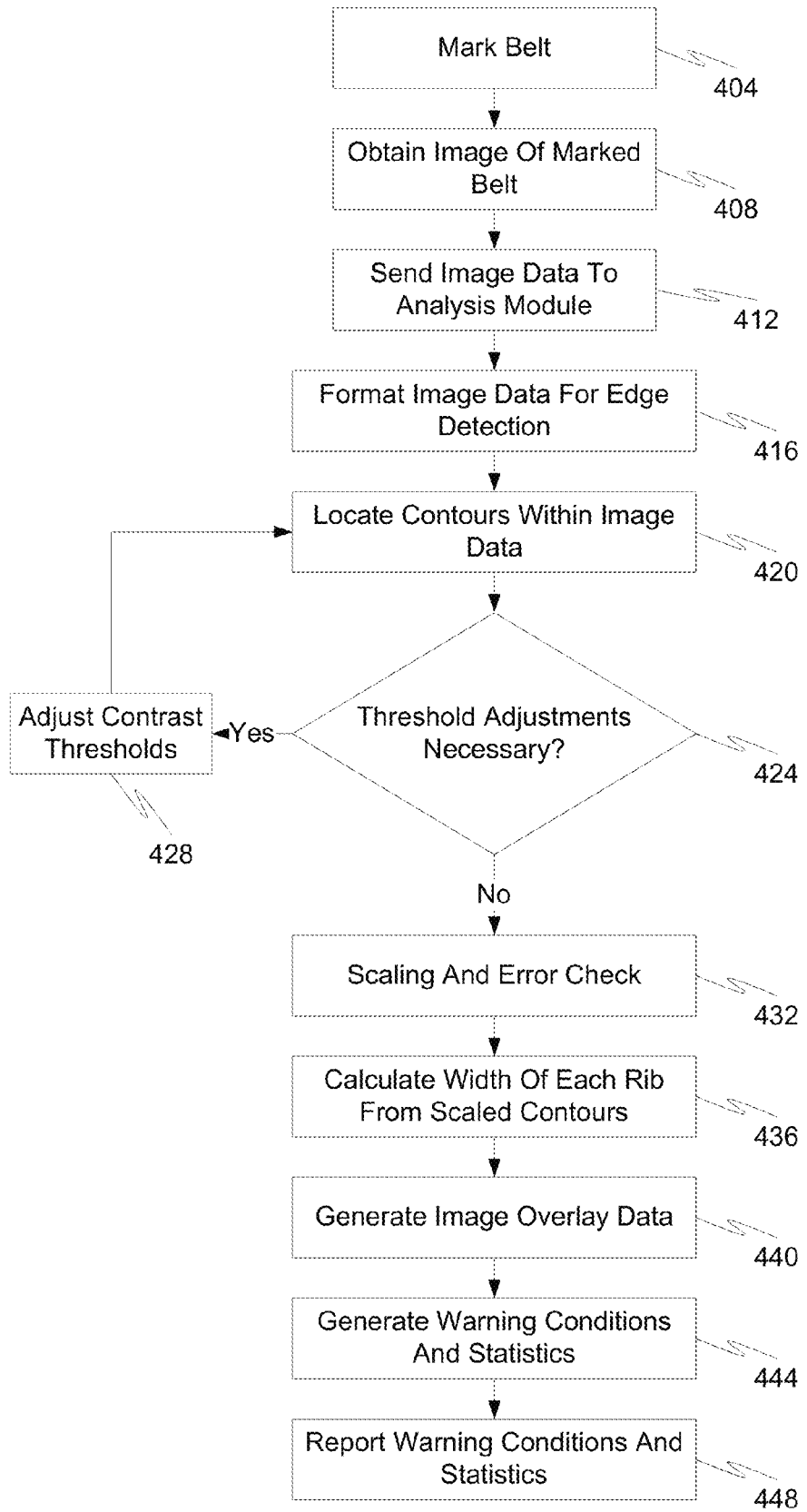
FIG. 4 is a flow diagram depicting a process for determining belt wear in accordance with embodiments of the present disclosure.

With reference now to FIG. 4, details of a testing procedure will be described in accordance with embodiments of the present disclosure. The method described herein will be directed toward the particular situation where a belt is the object under test 104; however, those of ordinary skill in the art will appreciate that one or more of the steps described herein may be used for testing objects of other types for any type of wear.

In a belt-testing method, the first step may be to mark the belt with one or more indicators that create a visible contrast on one or more features of the belt (step 404). In some embodiments, the belt may be marked during its manufacture at one or more predetermined locations and this may be all that is required during the belt-marking step. In other embodiments, the belt may not be manufactured with any particular mark that will be used for testing of the belt. Rather, the belt may be marked just prior to taking one or more images of the belt. In some embodiments, the belt may be marked with a highlighter, pen, marker, or the like to create one or more contrasting objects on the belt. The types of features of the belt that are marked may depend upon the type of wear that is being tested on the belt. If the belt is designed to wear at its ribs, then one, two, three, four, or all of the ribs of the belt may be marked at a common point on the belt with a marker or the like. Alternatively, the belt may be marked in its valleys or at other predetermined locations on the belt. In other embodiments, the belt may have a pre-manufactured feature that only becomes visible as the belt wears. Specifically, the belt may comprise a number of layers of EPDM materials, and one of those layers may comprise a different coloring than the other layers in the belt. Accordingly, as the belt wears, the layer of the other color may become exposed and this may be sufficient to mark the belt in accordance with embodiments of the present disclosure.

After the belt has been marked, and regardless of the manner in which it has been marked, the method proceeds with the image-capture device 108 obtaining one or more images of the belt at the location(s) in which it has been marked (step 408). As discussed above, the image(s) can be obtained using still-image cameras, video cameras, etc.

The data from the one or more images (e.g., the pixel data) is then transmitted to the analysis module 116 for analysis thereby (step 412). In some embodiments, the image data may comprise any type of known image file formats that is a standardized mechanisms of organizing and storing digital images. The image file(s) may be composed of either pixels, vector (geometric) data, or a combination of the two. Whatever the format, the files are rasterized to pixels when displayed on most graphic displays. The pixels that constitute an image are ordered as a grid (columns and rows); each pixel consists of numbers representing magnitudes of brightness and color for a specific location within the image. It should be appreciated that any type of image file may be used to transport the image data to the analysis module. Non-limiting examples of such image files include JPEG, Exif, TIFF, RAW, PNG, GIF, BMP, PPM, PGM, PBM, PNM, WEBP, CGM, Gerber Format (RS-274X), SVG, PNS, JPS, or any other type of known or yet-to-be-developed image format.

The transmission step may also comprise formatting the image file(s) such that the image data can be communicated to the analysis module 116 via the communication network 204. Accordingly, the image file(s) may be packetized and formatted for transmission across the communication network 204 (e.g., within one or more communication packets transmitted via the Internet).

While traveling to the analysis module 116, the image(s) may be formatted for edge detection by the image conversion module 112 (step 416). Depending upon the location of the image conversion module 112, this step may be performed before or after transmission of the image data. For instance, if the image conversion module 112 and analysis module 116 reside on the same device, then the transmission may occur before the formatting. However, if the image conversion module 112 and analysis module 116 reside on different devices, then the transmission may occur after the formatting.

In this formatting step, one or more image-processing techniques may be employed. As some examples, the image data may be converted to greyscale (if the images were originally obtained as color images), one or more filters may be applied to the image data (e.g., application of Gaussian Blur to smooth out any image noise and filter out other unwanted image data), the image data may be converted to binary data such as a black-and-white image (e.g., by applying a binary threshold algorithm to the greyscale image to convert any pixel above the threshold to one color (e.g., black) and convert any pixel equal to or below the threshold to the other color (e.g., white)).

After the image has been appropriately formatted, the method continues with the analysis module 116 locating one or more contours (e.g., identifying objects) within the image data (step 420). In some embodiments, the analysis module 116 may be configured to perform a Canny Edge Detection process. Other types of edge or blob-detection techniques may be employed without departing from the scope of the present disclosure. Examples of such techniques include, without limitation, Canny-Deriche, Differential, Sobel, Prewitt, Roberts Cross, Interest point detection, Corner detection, Harris operator, Shi and Tomasi, Level curve curvature, SUSAN, FAST, Laplacian of Gaussian (LoG), Difference of Gaussians (DoG), Determinant of Hessian (DoH), Maximally stable external regions, PCBR, Hough transform, Structure tensor, Affine invariant feature detection, Affine shape adaptation, Harris affine, Hessian affine, and so on.

In step 424, it may be determined if any threshold adjustments are necessary. Specifically, based on the results of the contour detection of step 420, all of the contours within the image data may be located. If a number of features (e.g., ribs) are detected and that number of detected features does not equal the expected number of features, then it may be necessary to adjust one or more thresholds that were used during the image formatting (step 428). As an example, the threshold(s) used to convert an image to a black-and-white image may be adjusted by using a bi-directional solver for thresholds that yields the expected number of features (e.g., ribs).

After the thresholds have been adjusted and the expected number of features has been detected in the image, then the method may be allowed to proceed out of the threshold-adjustment loop to a step where the image data is scaled and checked for errors (step 432). In particular, this step may be where the analysis module 116 converts the pixel data of the image to physical dimension information (e.g., the actual size of the belt is determined based on the size of the belt in the image, the actual size of the features (e.g., ribs) are determined based on the size of the features in the image, etc.).

In some embodiments, the size of the marked areas on the belt (e.g., rib tips) may be determined in physical units (e.g., area, linear dimensions, etc.) (step 436). In this step, the topmost and bottommost edges detected on the belt may be used to determine the scaling ratio. This scaling ratio can be determined in many situations because the type of belt being tested would be known and communicated to the analysis module 116, the width of that type of belt may be known to the analysis module 116 via the object database 120. The known length of the belt from the object database 120 may be equated to the detected width of the belt in the image (which is in pixels) and this ratio of physical units to pixel units may be used as a pixel-to-physical unit conversion ratio for the other objects in the image. Alternatively, rather than using known belt width data from the object database 120, the user 132 that obtains the image of the belt may also obtain a width measurement of the belt being tested and may provide that data to the analysis module 116 for purposes of converting pixel values to physical values. In yet another alternative or additional implementation, an image may be captured of an object of a known or standard size (e.g., ruler, penny, quarter, dollar bill, etc.) and the image of the object of a known or standard size may be used to convert pixel units to physical units. The object of a known or standard size may be included in the image of the belt or it may be obtained in an image separate from the image of the belt.

Figure 6:
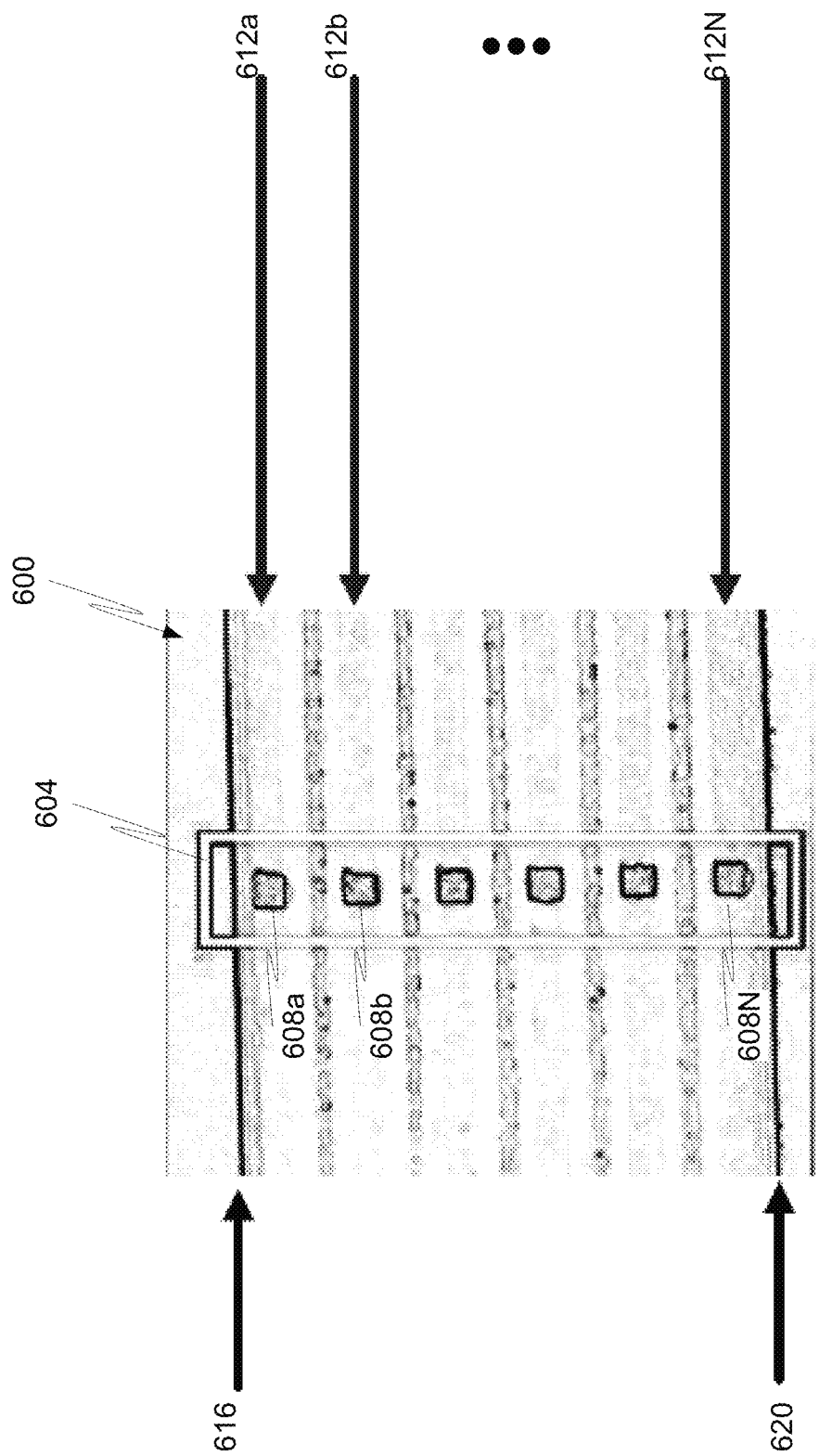
FIG. 6 depicts components of an image in accordance with embodiments of the present disclosure.

Another analysis step that may be performed by the analysis module 116 is an image overlay step where the image of the belt being tested is overlaid against one or more images of belts having known physical dimensions (step 440). An alternative image overlay step may involve the analysis module 116 overlaying the calculated dimensions of the marked features (e.g., rib width dimensions) against the original image such that the user 132 can check to ensure that the analysis module 116 has accurately identified the features of the belt from the image. The features analyzed by the analysis module 116 may include the size, shape, and/or distance between marked portions of the belt and/or size, shape, and/or distance between unmarked portions of the belt. As example of an overlaid image which may be used in accordance with embodiments of the present disclosure is depicted in FIG. 6 where the calculated areas of certain features are overlaid against the actual image.

Depending upon the results of the analysis of the image(s), the analysis module 116 may determine that the object (e.g., belt) is either good, bad, etc. and based on this determination, the analysis module 116 may generate one or more warning conditions regarding the condition of the object (step 444). Alternatively, or in addition, the analysis module 116 may generate other statistics about the belt such as predicted use history based on detected wear, proposed next steps (e.g., re-check the belt in X time, replace the belt and check the new belt in Y time, abnormal wear detected therefore check other components that interface with belt, etc.).

The warning conditions or other results of the analysis may then be reported back to the user 132 (step 448). The reports of the analysis may be transmitted in one or more communication packets over the communication network 204, unless the analysis module 116 resides on the user device 208 or some other device that is co-located with the user interface 128.

Figure 5:
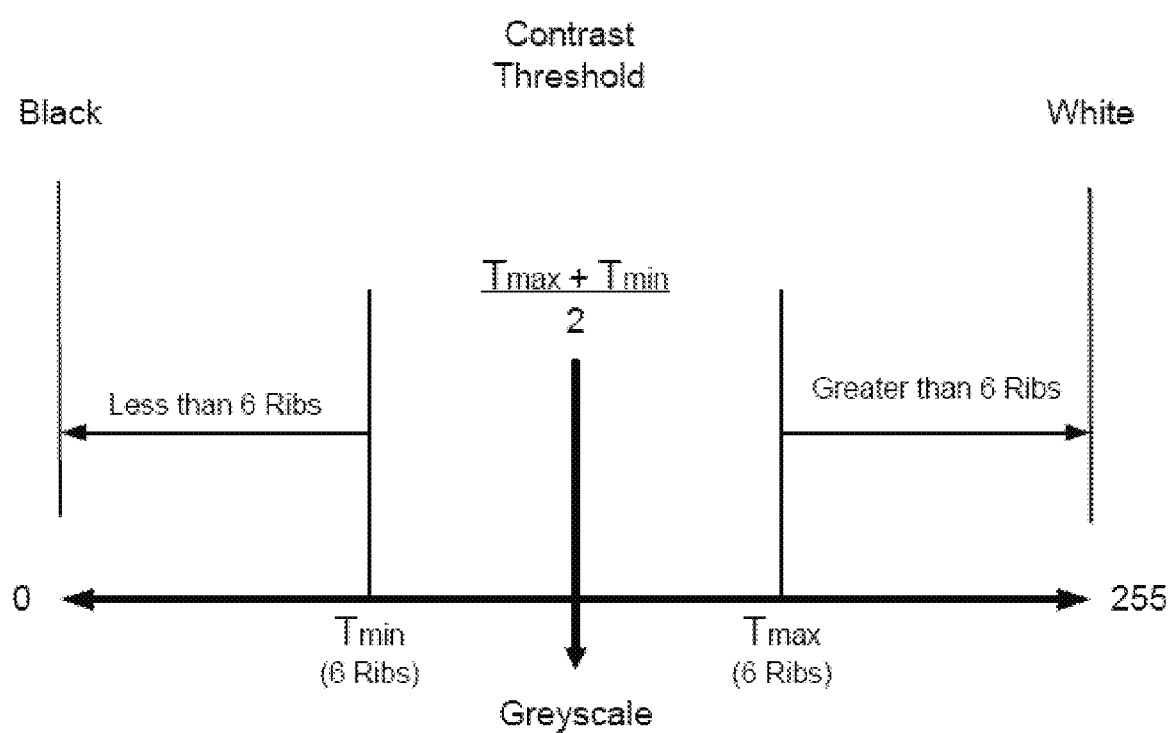
FIG. 5 is a diagram depicting a contrast threshold in accordance with embodiments of the present disclosure.

With reference now to FIG. 5, one example of a contrast threshold solving routine will be described in accordance with embodiments of the present disclosure. Specifically, the analysis module 116 in the threshold-adjustment loop of steps 424 and 428 may perform this particular routine automatically. In the example depicted in FIG. 5, an image being analyzed may comprise a 256 value greyscale image where each pixel in the image may include a value ranging in magnitude from 0 to 255 (e.g., where 0=black and 255=white). There is an optimum threshold value (a greyscale value somewhere between 0 and 255), which results in the best edge detection by the analysis module 116. In some embodiments, it may be possible to solve both directions from white to black. There is a threshold value (greyscale) at which the rib count is equal to the target. Tmin equals the point closest to black where the detected rib count=target rib count. Tmax equals the point closest to white where the detected rib count=target count. In some embodiments, the values of Tmin and Tmax may be solved using a binary method. Once solved, the values of Tmin and Tmax may be used to determine an optimum threshold, which equals the average greyscale value of Tmin and Tmax. An alternative, or perhaps complimentary, algorithm for determining the threshold value will be described in further detail with reference to FIGS. 9-11.

Referring now to FIG. 6, additional details of an example overlay image of a belt 600 will be described in accordance with embodiments of the present disclosure. The image of the belt 600 may be converted into a binary image and analyzed by the analysis module 116. Based on this analysis, the detected edges or contours may be overlaid onto the actual image to produce the overlaid image 600. As can be seen, the types of features that may be detected by the analysis module 116 include one or more markings 608a-N on the ribs 612a-N of the belt, a first edge 616 (e.g. topmost edge) of the belt, and a second edge 620 (e.g., bottommost edge) of the belt. The markings 608a-N may be detected within a zoom window 604 that identifies the region of interest within the image. In some embodiments, the zoom window may be automatically generated and positioned about the plurality of markings 608a-N. In other embodiments, a user 132 may interact with the testing application 224 to manually identify the zoom window 604 to help the analysis module 116 focus its analysis on the contours within the zoom window 604.

Specifically, part of the testing application's 224 operation may instruct the user 132 to select the area of the zoom window 604 such that the plurality of markings 608a-N are within the zoom window 604 and the first and second edges 616, 620 are also within the zoom window 604. This can also help the analysis module 116 to create a more accurate conversion of pixel values to physical values. In particular, the edges 616, 620 may become relatively easy to distinguish from the markings 608a-N because the edges 616, 620 traverse the entire width of the zoom window 604 whereas the markings 608a-N do not. Accordingly, the analysis module 116 may use this fact and a simple rule that states if a contour is detected as traversing the entire width of the zoom window 604, then that contour may be treated as one of the edges 616, 620, whereas if a contour is detected as not traversing the entire width of the zoom window 604, then that contour may be treated as a marking 608.

In some embodiments, the analysis module 116 may calculate the top and bottom Y values for the belt (e.g., the belt width) in pixel units and then an ideal width from rib count and rib spacing may be computed based on at least some information obtained from the object database 120. Thereafter, the following equation may be used to calculate a scale factor for converting pixel value to physical values:

$$PixelScale = \text{Abs}(Y(\text{pixels})_{top} - Y(\text{pixels})_{bottom}) \times \frac{1}{(\text{\# ribs} \times ribSpacing)}$$

In some embodiments, the following equation can also be used to determine belt width based on a calculated rib spacing and distance between rib centers:

$$PixelScale = \frac{\sum_{i=1}^{n} \text{Abs}(ribCenter_i - ribCenter_{i-1})}{(n-1) \times ribSpacing}$$

Thereafter, an error check step (e.g., step 432) may be performed where the pixel position of the nth rib from the top is determined according to the following equation:

$$NthRibPosition = \left[rib\# \times ribSpacing - \left(\frac{ribSpacing}{2}\right)\right] \times \frac{1}{PixelScale}$$

The center of each detected rib may then be calculated according to the equation above and the image may be rejected if the difference between the detected rib position and the expected rib position is too great (e.g., exceeds a predetermined threshold).

Figure 7A:
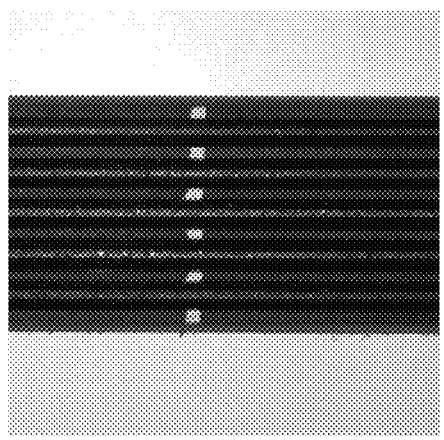
FIG. 7A depicts a first image in accordance with embodiments of the present disclosure.
Figure 7B:
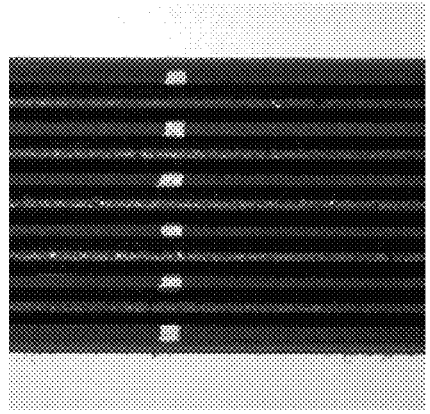
FIG. 7B depicts a second image in accordance with embodiments of the present disclosure.
Figure 7C:
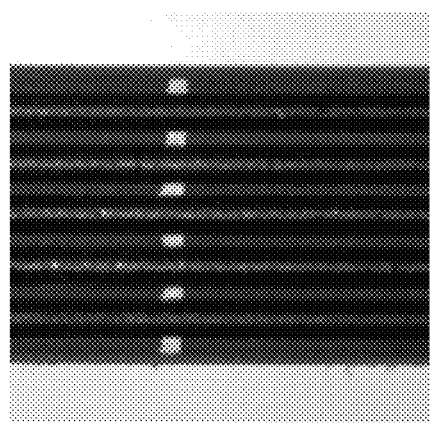
FIG. 7C depicts a third image in accordance with embodiments of the present disclosure.
Figure 7D:
FIG. 7D depicts a fourth image in accordance with embodiments of the present disclosure.

FIGS. 7A-D depict examples of an image of an object under test 104 during various stages of the image analysis. Specifically, FIG. 7A depicts an original image of a belt, which may have been originally in greyscale or color. FIG. 7B depicts a greyscale conversion of the image in FIG. 7A if the image in FIG. 7A was originally in color. FIG. 7C depicts the image after a filter (e.g., Gaussian Blur) has been applied to the image of FIG. 7B. FIG. 7D depicts the image of FIG. 7C after the image has been converted to a black-and-white image. It is this image which may be analyzed by the analysis module 116 to detect edges in the image (e.g., marked features of the belt).

Figure 8:
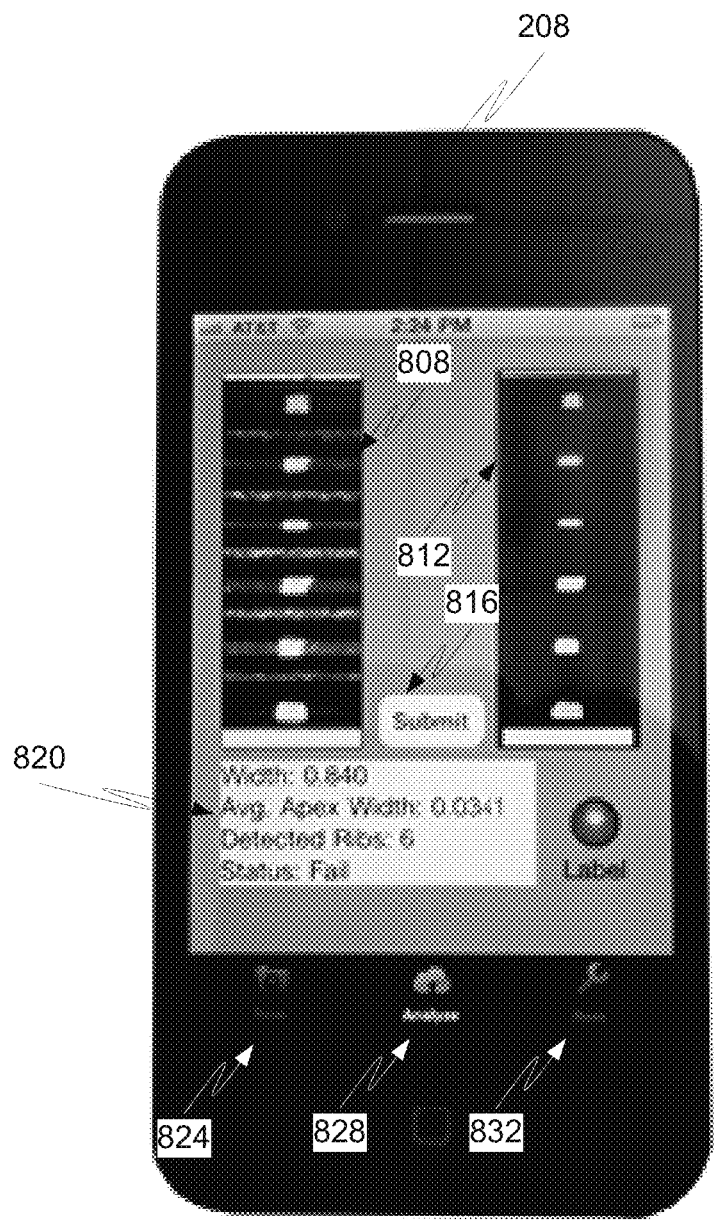
FIG. 8 depicts a user interface for a belt measurement application in accordance with embodiments of the present disclosure.

FIG. 8 depicts one example of a user interface presentation that may be provided to a user 132 after the image has been analyzed by the analysis module 116. Specifically, the presentation may be provided on the user interface 128 of the user device 208 and the presentation may comprise a first presentation area 808 where the original image within a zoom window 604 is depicted, a second presentation area 812 where the analyzed black-and-white image is depicted (or possibly where an overlay image is depicted), a submit button 816, a results display portion 820, an image-capture button 824, an analyze button 828, and a settings button 832.

As can be appreciated, the submit button 816 may cause the user device 208 to transmit the image from the first presentation area 808 to the analysis module 116 and the overlay image 600 may be presented in the second presentation area 812.

The results display portion 820 may be used to display statistical results, recommended remedial actions, historical wear data, and other data obtained from the analysis of the image and/or data obtained from the object database 120. The results display portion 820 may also display any assumptions made by the analysis module 116 in analyzing the object under test 104.

The buttons 824, 828, 832 may be used to cause the testing application 224 to perform one or more actions associated with the button. Specifically, the image-capture button 824 may cause the user device 208 to activate the image-capture device 108 and capture an image of the object under test 104. The analyze button 828 may cause the user device 208 to format and send the captured image to the analysis module 116 for testing. The settings button 832 may enable a user 132 to configure settings of the testing application 224 and perform other administrative tasks.

Although not depicted, the interface may also comprise an area where a user is allowed to provide feedback information to the analysis module 116 (e.g., other comments related to wear of the object under test 104, comments on the accuracy of the analysis, comments on the accuracy of the assumptions, etc.). There may also be a dialog box, which enables a user 132 to directly access the object database 120. There may also be a window presented to the user 132 after the image of the object under test 104 is captured and within this window, the user 132 may be allowed to select the size and orientation of the zoom window 604 relative to the image. Other types of dialog boxes, buttons, etc. may also be made available to a user 132 without departing from the scope of the present disclosure.

Figure 9:
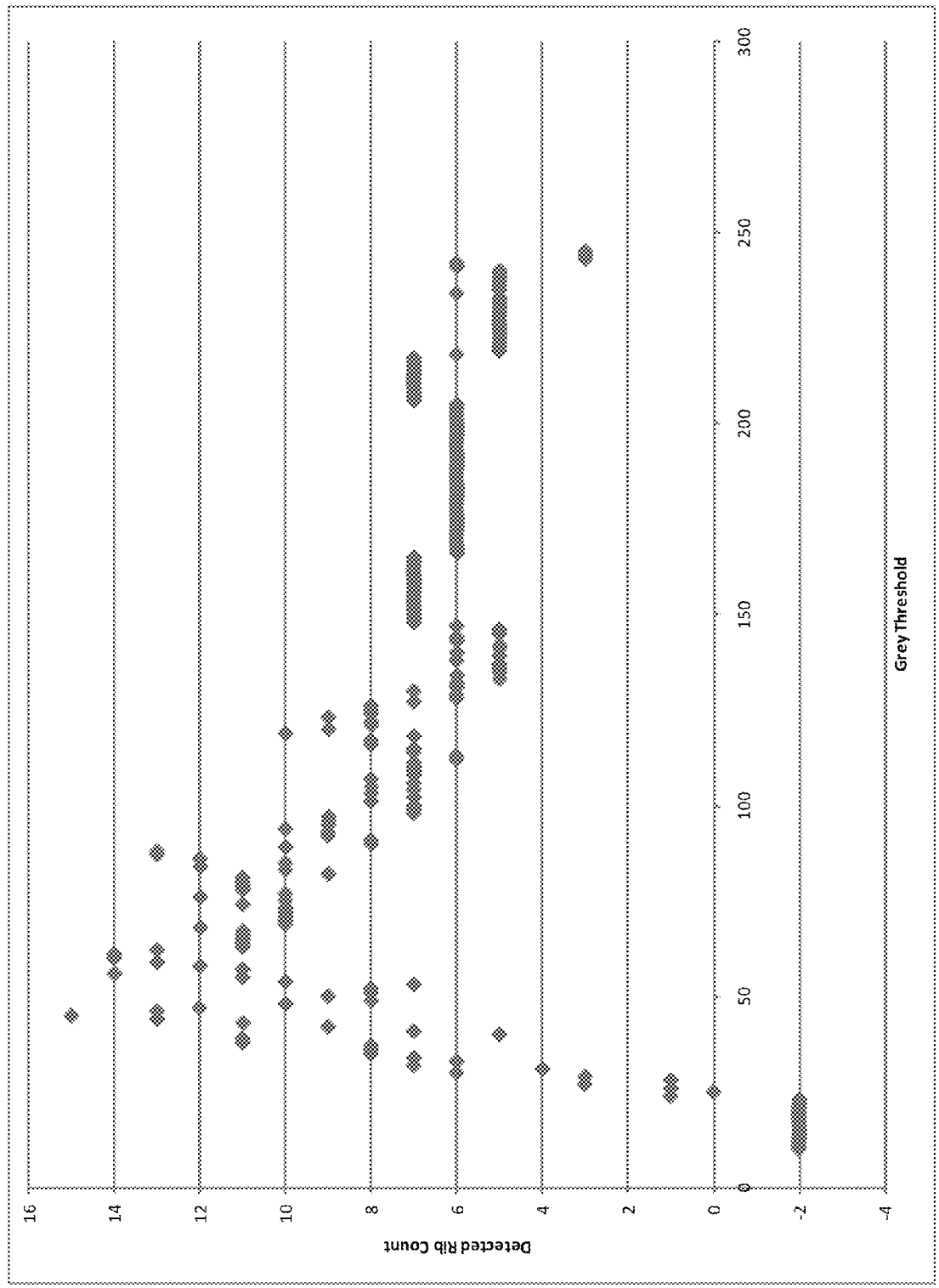
FIG. 9 depicts a data sample indicating a number of detected ribs from a belt image as a function of threshold level.
Figure 10:
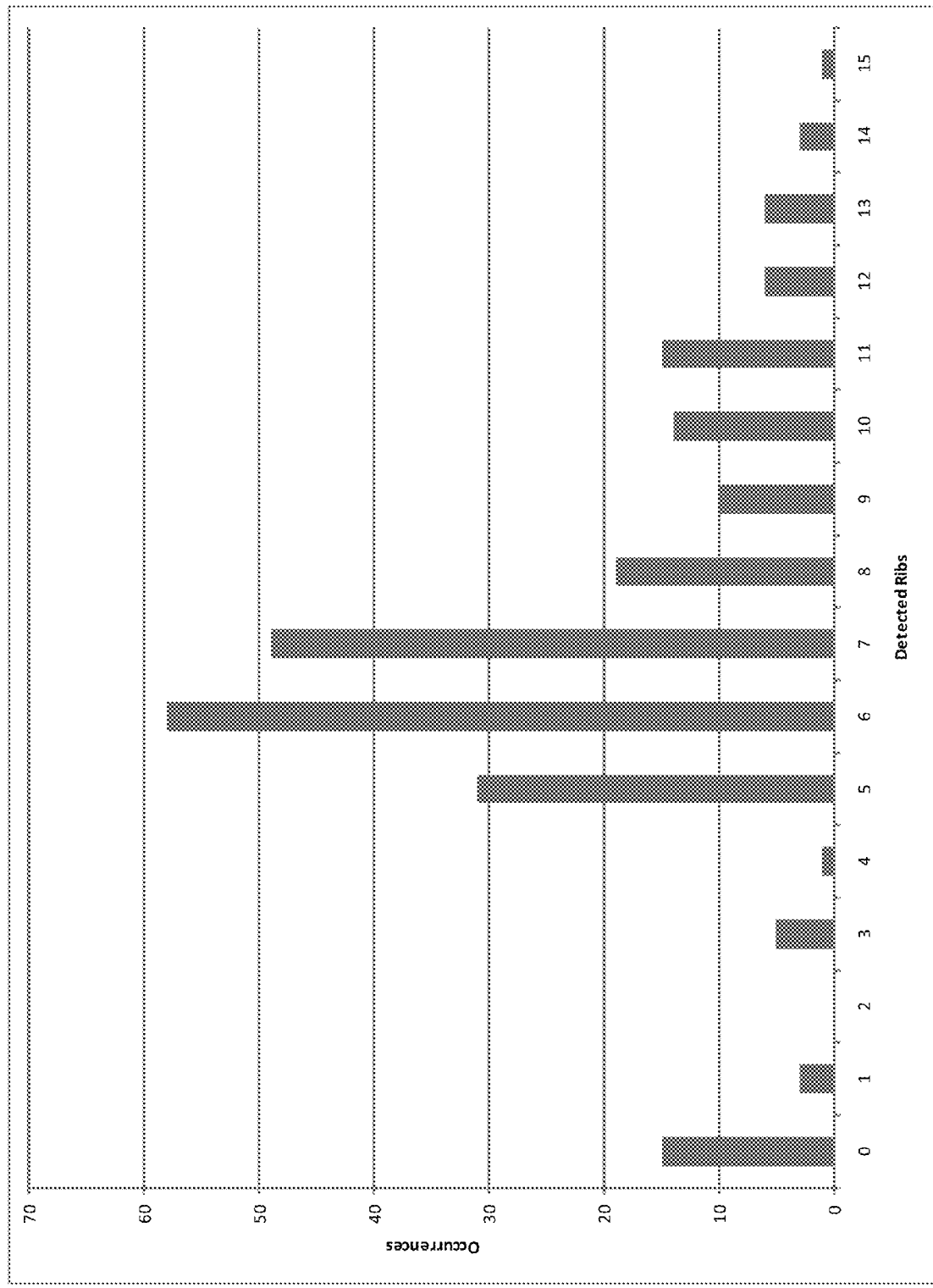
FIG. 10 depicts a histogram of the data sample from FIG. 9 showing the number of occurrences for each rib count.
Figure 11:
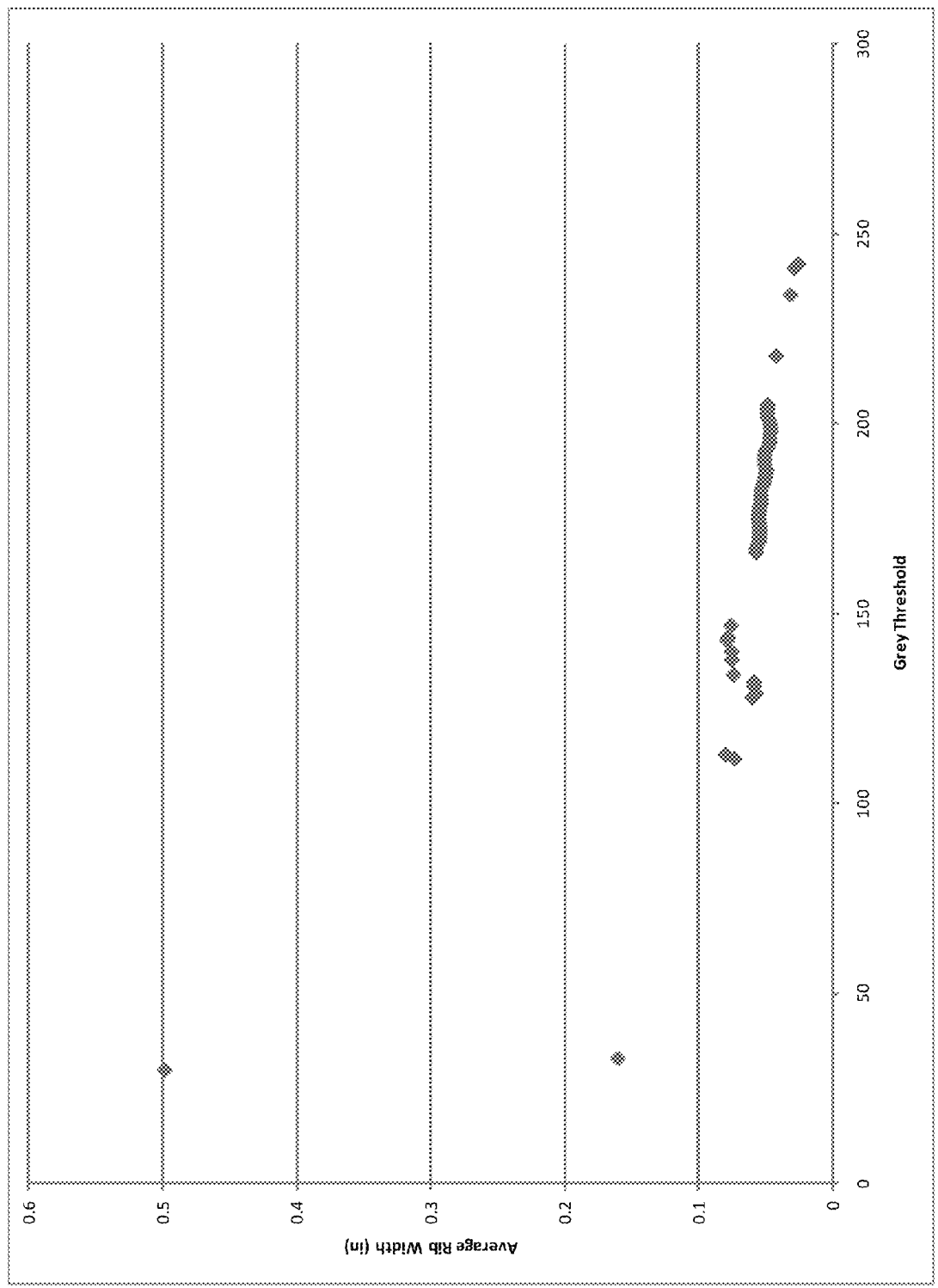
FIG. 11 depicts a filtered data set where data from the highest frequency of rib counts is used in determining a usable threshold level.

With reference now to FIGS. 9-11, an alternative algorithm for determining a threshold value will be described in accordance with embodiments of the present disclosure. This particular algorithm may be used as an alternative to the algorithm discussed in connection with FIG. 5 or it may be used to compliment the algorithm discussed in connection with FIG. 5. Specifically, the threshold-selection algorithm begins by sampling an image of a belt (or other type of object) using a grey threshold between two extremes (e.g., 0 to 256 or any other discrete levels between two binary colors). At each sampled threshold, the number of ribs on the belt is detected (FIG. 9). The analysis module 116 may be configured to step though each candidate threshold and determine a number of ribs detected at each candidate threshold until the entire plot of FIG. 9 is created.

After the number of ribs has been recorded for each threshold level, the analysis module 116 may find the mode rib count (e.g., the most-often occurring rib-count value obtained from the test set summarized in FIG. 9). The rib-count data may then be incorporated into another data set that correlates a rib count to a number of occurrences for that rib count (FIG. 10).

In the example depicted herein, the six ribs was determined to have the most occurrences of any other rib count. Accordingly, the data set from FIG. 9 may then be filtered with the most-frequent rib count from FIG. 10 to result in a filtered data set that is depicted in FIG. 11. The threshold values in FIG. 11 represent only the threshold values obtained for the rib count of six (e.g., the most frequently-occurring rib count). The analysis module 116 may use the filtered data from FIG. 11 to determine a more accurate threshold value for converting a grayscale image into a black-and-white image. Specifically, the analysis module 116 may determine a median or mean threshold value from the filtered data. By analyzing the filtered data, the analysis module 116 will be configured to ignore certain outliers (e.g., thresholds that result in the detection of 15 ribs) and, therefore, obtain a more useful threshold value.

It should be appreciated that the above-described algorithm for determining a threshold value may be used in determining a grayscale threshold value, a color threshold value, or a threshold value for any other type of pixel data. In other words, the above-described algorithm is not intended to be limited to the conversion of grayscale images to black-and-white images.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method of measuring a wear condition of a belt, comprising:
   obtaining a raster image of the belt, the raster image including image data for at least one feature of the belt including at least a portion of a rib not co-located with a belt edge;
   analyzing the raster image of the belt;
   based on the analysis of the raster image of the belt, determining physical dimensions of the at least one feature of the belt;
   based on the determined physical dimensions of the at least one feature of the belt, determining a wear condition for the at least the portion of the rib;
   preparing a report that includes the results of the analysis of the raster image of the belt and the determined wear condition for the belt; and
   transmitting the report to a user device operated by at least one interested party.

2. The method of claim 1, wherein the at least one feature of the belt comprises one or more belt ribs, wherein analyzing the raster image of the belt comprises:
   converting a first image of the belt to a binary pixel data image of the belt, wherein the conversion of the first image to the black-and-white image is performed by:
   determining a minimum threshold that corresponds to a minimum pixel value where a determined number of belt ribs equals an expected number of belt ribs;
   determining a maximum threshold that corresponds to a maximum pixel value where a determining number of belt ribs equals the expected number of belt ribs; and
   determining an average of the minimum threshold and maximum threshold and using the determined average as a threshold for converting the first image to the binary pixel data image.

3. The method of claim 2, wherein the first image comprises a color image and wherein the determined threshold for converting the first image to the binary pixel data image corresponds to threshold values for red, green, and blue pixel color values.

4. The method of claim 2, wherein the first image comprises a greyscale image and wherein the determined threshold for converting the first image to the binary pixel data image corresponds to a greyscale pixel value.

5. The method of claim 1, wherein the user device to which the report is transmitted is the same device which captured the raster image of the belt.

6. The method of claim 1, wherein the physical dimensions of the at least one feature of the belt are determined by determining a conversion value that when multiplied by a number of pixels corresponds to a physical dimension, wherein the conversion value is determined by calculating the number of pixels between a detected first edge of the belt and a detected second edge of the belt.

7. The method of claim 6, wherein the detected first edge and detected second edge are detected as contours that traverse an entire length of a zoom window placed around at least one feature of the belt and the first and second edges of the belt.

8. The method of claim 1, wherein the wear condition for the belt comprises at least one of good, bad, and questionable and wherein the wear condition for the belt is determined by comparing a detected distance between a first feature of the belt and a second feature of the belt and comparing the detected distance with an expected distance.

9. The method of claim 8, wherein the expected distance is retrieved from an object database that comprises data about a plurality of different types of belts, wherein the data for each of the plurality of different types of belts includes one or more of belt identifier, rib count, rib profile, thresholds, wear history, and replacement history.

10. The method of claim 1, further comprising modifying an operating parameter of equipment that is using the belt based on the wear data of the belt.

11. A method of measuring a wear condition of a belt, comprising:
    obtaining a raster image of the belt, the raster image including image data for at least one feature of the belt;
    analyzing the raster image of the belt;
    based on the analysis of the raster image of the belt, determining physical dimensions of the at least one feature of the belt;
    based on the determined physical dimensions of the at least one feature of the belt, determining a wear condition for the belt;
    preparing a report that includes the results of the analysis of the raster image of the belt and the determined wear condition for the belt;
    transmitting the report to a user device operated by at least one interested party; and
    wherein the at least one feature of the belt comprises one or more belt ribs, wherein analyzing the raster image of the belt comprises:
    converting a first image of the belt to a binary pixel data image of the belt, wherein the conversion of the first image to the black-and-white image is performed by:
    determining a minimum threshold that corresponds to a minimum pixel value where a determined number of belt ribs equals an expected number of belt ribs;
    determining a maximum threshold that corresponds to a maximum pixel value where a determining number of belt ribs equals the expected number of belt ribs; and
    determining an average of the minimum threshold and maximum threshold and using the determined average as a threshold for converting the first image to the binary pixel data image.

12. The method of claim 11, wherein the user device to which the report is transmitted is the same device which captured the raster image of the belt.

13. The method of claim 11, wherein the physical dimensions of the at least one feature of the belt are determined by determining a conversion value that when multiplied by a number of pixels corresponds to a physical dimension, wherein the conversion value is determined by calculating the number of pixels between a detected first edge of the belt and a detected second edge of the belt.

14. The method of claim 13, wherein the detected first edge and detected second edge are detected as contours that traverse an entire length of a zoom window placed around at least one feature of the belt and the first and second edges of the belt.

15. The method of claim 11, wherein the wear condition for the belt comprises at least one of good, bad, and questionable and wherein the wear condition for the belt is determined by comparing a detected distance between a first feature of the belt and a second feature of the belt and comparing the detected distance with an expected distance.

16. The method of claim 15, wherein the expected distance is retrieved from an object database that comprises data about a plurality of different types of belts, wherein the data for each of the plurality of different types of belts includes one or more of belt identifier, rib count, rib profile, thresholds, wear history, and replacement history.

17. The method of claim 11, wherein the first image comprises a color image and wherein the determined threshold for converting the first image to the binary pixel data image corresponds to threshold values for red, green, and blue pixel color values.

18. The method of claim 17, wherein the physical dimensions of the at least one feature of the belt are determined by determining a conversion value that when multiplied by a number of pixels corresponds to a physical dimension, wherein the conversion value is determined by calculating the number of average pixels between adjacent ribs.

19. The method of claim 17, wherein the detected first edge and detected second edge are detected as the inner edges of the outermost regions.

20. The method of claim 11, wherein the first image comprises a greyscale image and wherein the determined threshold for converting the first image to the binary pixel data image corresponds to a greyscale pixel value.

* * * * *